United States Patent
Li et al.

(10) Patent No.: US 10,433,491 B2
(45) Date of Patent: Oct. 8, 2019

(54) HEDGE TRIMMER

(71) Applicant: CHERVON (HK) LIMITED, Wanchai (HK)

(72) Inventors: Li Li, Nanjing (CN); Fangjie Nie, Nanjing (CN); Toshinari Yamaoka, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 0 days.

(21) Appl. No.: 15/862,153

(22) Filed: Jan. 4, 2018

(65) Prior Publication Data
US 2018/0139907 A1    May 24, 2018

Related U.S. Application Data

(63) Continuation of application No. 15/262,681, filed on Sep. 12, 2016, now Pat. No. 9,877,435.

(30) Foreign Application Priority Data

Sep. 15, 2015  (CN) .......................... 2015 1 0582764
Sep. 15, 2015  (CN) .......................... 2015 1 0583676
(Continued)

(51) Int. Cl.
*A01G 3/053*  (2006.01)
*B25F 5/02*   (2006.01)

(52) U.S. Cl.
CPC ............... *A01G 3/053* (2013.01); *B25F 5/02* (2013.01)

(58) Field of Classification Search
CPC ................................ A01G 3/053; B25F 5/02
See application file for complete search history.

(56) References Cited

U.S. PATENT DOCUMENTS 1,814,649 A  *  7/1931  Wade ...................... A01G 3/053
                                                          172/41
2,349,401 A  *  5/1944  Beckwith .............. B23B 45/008
                                                          173/170
(Continued)

FOREIGN PATENT DOCUMENTS

CN         103004485 A       4/2013
CN         103299835 A       9/2013
(Continued)

OTHER PUBLICATIONS

DC MOtors. Page author: Eric Seale last updated on Oct. 17, 2016 Relevant portion was present since Aug. 15, 2002, as seen in Wayback machine, at https://web.archive.org/web/20020815071826/http://solarbotics.net/starting/200111_dcmotor/200111_dcmotor2.html (Year: 2002).*

(Continued)

*Primary Examiner* — Sean M Michalski
(74) *Attorney, Agent, or Firm* — Greenberg Traurig, LLP

(57) ABSTRACT

A hedge trimmer includes a first housing with a first handle, a second housing with a second handle, a transmission mechanism combined to the first housing, a trimming blade for being driven by the transmission mechanism to carry out a shearing motion, an electric motor combined to the first housing and for driving the transmission mechanism, and a battery pack combined to the second housing and for supplying power to the electric motor. The first and second housings respectively include first and second rotation connection parts for making them be connected and rotatable around a rotation axis. The second housing has first and second rotation positions when being rotated with respect to the first housing. A plane perpendicular to the rotation axis is obliquely intersected with a plane perpendicular to a longitudinal axis of the trimming blade.

20 Claims, 11 Drawing Sheets

(30) Foreign Application Priority Data

Sep. 15, 2015 (CN) .......................... 2015 1 0586701
Sep. 15, 2015 (CN) .......................... 2015 1 0587038

(56) References Cited

U.S. PATENT DOCUMENTS

| | | | | |
|---|---|---|---|---|
| 5,025,562 | A * | 6/1991 | Palm | B23D 49/162 30/392 |
| 5,598,636 | A * | 2/1997 | Stolzer | B23D 49/165 30/393 |
| 6,249,979 | B1 * | 6/2001 | Bednar | B23D 49/165 30/182 |
| 7,287,331 | B2 * | 10/2007 | Sasaki | A01G 3/053 16/110.1 |
| 8,397,389 | B2 * | 3/2013 | Geromiller | A01G 3/053 30/208 |
| 9,032,630 | B2 | 5/2015 | Brown et al. | |
| 9,220,201 | B2 * | 12/2015 | Kratzig | A01G 3/053 |
| 2003/0110645 | A1 * | 6/2003 | Phillips | B23D 49/11 30/392 |
| 2004/0148789 | A1 * | 8/2004 | Gist | B23D 49/11 30/392 |
| 2005/0204568 | A1 * | 9/2005 | Sasaki | A01G 3/053 30/210 |
| 2006/0117581 | A1 * | 6/2006 | Oki | B23D 49/162 30/392 |
| 2006/0260141 | A1 * | 11/2006 | Phillips | B23D 49/11 30/392 |
| 2007/0000138 | A1 * | 1/2007 | Baskar | A01G 3/053 30/392 |
| 2009/0064504 | A1 * | 3/2009 | Kodama | A01G 3/053 30/296.1 |
| 2009/0241354 | A1 * | 10/2009 | Zhou | B23D 49/167 30/393 |
| 2010/0037469 | A1 * | 2/2010 | Chubb | A01G 3/00 30/198 |
| 2010/0095533 | A1 * | 4/2010 | Takahashi | A01G 3/053 30/228 |
| 2010/0126027 | A1 * | 5/2010 | Oberheim | B23D 49/16 30/392 |
| 2010/0146796 | A1 * | 6/2010 | Geromiller | A01G 3/053 30/223 |
| 2010/0281697 | A1 * | 11/2010 | Tate | A01G 3/053 30/312 |
| 2011/0010951 | A1 * | 1/2011 | Harrison | B23D 51/02 30/376 |
| 2011/0162214 | A1 * | 7/2011 | Codeluppi | A01D 34/902 30/276 |
| 2011/0162219 | A1 * | 7/2011 | Okouchi | B25F 5/02 30/383 |
| 2011/0203122 | A1 * | 8/2011 | Holcomb | B27B 17/00 30/382 |
| 2011/0241457 | A1 * | 10/2011 | Muller | A01D 34/902 310/50 |
| 2012/0005905 | A1 * | 1/2012 | Brown | A01G 3/08 30/383 |
| 2012/0017558 | A1 * | 1/2012 | Pellenc | A01G 3/04 56/233 |
| 2012/0073144 | A1 * | 3/2012 | Tamura | A01G 3/053 30/272.1 |
| 2012/0249313 | A1 * | 10/2012 | Valfridsson | H01H 9/06 340/407.2 |
| 2013/0130552 | A1 * | 5/2013 | Ota | H01R 31/065 439/620.21 |
| 2016/0113209 | A1 * | 4/2016 | Sergyeyenko | A01G 3/053 30/216 |
| 2017/0127619 | A1 * | 5/2017 | Rosskamp | A01G 3/053 |
| 2017/0157760 | A1 * | 6/2017 | McAuliffe | B25F 5/008 |
| 2017/0232601 | A1 * | 8/2017 | Gieske | A01G 3/086 30/381 |
| 2017/0251608 | A1 * | 9/2017 | Chou | A01G 3/086 |

FOREIGN PATENT DOCUMENTS

| | | |
|---|---|---|
| EP | 2540453 A2 | 1/2013 |
| EP | 2540153 B1 | 8/2016 |

OTHER PUBLICATIONS

CIPO, Office Action issued on Canadian patent application No. 2,941,762, dated May 28, 2018, 4 pages.
Canadian Intellectual Property Office, Office Action issued on CA Application No. 2,941,762, dated Aug. 24, 2017, 4 pgs.

* cited by examiner

HEDGE TRIMMER

RELATED APPLICATION INFORMATION

This application claims the benefit of and is a continuation of U.S. application Ser. No. 15/262,681, filed on Sep. 12, 2016, which application claims the benefit of CN 201510587038.8, filed on Sep. 15, 2015, CN 201510583676.2, filed on Sep. 15, 2015, CN 201510582764.0, filed on Sep. 15, 2015, and CN 201510586701.2, filed on Sep. 15, 2015, the disclosures of which are incorporated herein by reference in their entirety.

BACKGROUND

This following disclosure relates to a hedge trimmer.

A hedge trimmer is a kind of garden or gardening tool and includes a trimming blade, a front handle and a rear handle. The trimming blade is capable of carrying out reciprocating motion to cut a variety of shrubs, hedges and so on. In a trimming process, the user grasps the two different handles by two hands respectively, and the user then controls a position of the trimming blade by moving the handles to control the cutting position.

The structure of a housing of the traditional hedge trimmer is relatively fixed, the positions of the front and rear handles cannot be adjusted and thus it is not able to work efficiently under complex working conditions. It is only suitable for simple cutting in horizontal plane, when there is a need of vertical cutting or oblique cutting, it is difficult to operate and is very inconvenient for the two hands to grip the handles.

The housing of the traditional hedge trimmer is generally made of a single material, and its heat dissipating effect is relatively poor. After working for a long time, the temperature would be excessively high and therefore it is easy to cause damage of the hedge trimmer.

For a traditional electric motor, in order to reduce the temperature of the electric motor and accelerate cooling, a cooling fan is equipped. However, when the cooling fan is rotating, the phenomenon of airflow spinning around the inside the casing of the electric motor can result in poor cooling effect.

SUMMARY

A hedge trimmer includes a trimming blade that extends along a longitudinal axis and configured (i.e., structured and arranged) for carrying out reciprocating motion, a first housing, being formed or connected with a first handle and disposed with a first locking portion, a second housing, being formed or connected with a second handle and rotatable with respect to the first handle around a rotation axis wherein a plane perpendicular to the rotation axis is obliquely intersected with a plane perpendicular to the longitudinal axis of the trimming blade, a transmission mechanism, being combined to the first housing and for driving the trimming blade, an electric motor, being combined to the first housing and for driving the transmission mechanism, a battery pack, being combined to the second housing and for supplying the electric motor with electric power, a trigger, configured for controlling the electric motor, and a control member, being movably connected to the first housing or the second housing and including a stopper portion and a second locking portion matched with the first locking portion. The control member has a first position and a second position with respect to the second housing. When the control member is at the first position, the first locking portion and the second locking portion are engaged with each other, the second housing and the first housing are relatively fixed. When the control member is at the second position, the stopper portion stops movement of the trigger, the first locking portion and the second locking portion are disengaged with each other, and therefore the second housing is allowed to rotate with respect to the first housing around the rotation axis.

The first locking portion may be formed with a recess, and the second locking portion is formed with a protrusion matched with the recess.

The control member may further include a manipulating portion configured to enable the control member to move between the first position and the second position. The manipulating portion is located between the second handle and the battery pack.

The hedge trimmer may further include a biasing member connected to the second housing and for applying a biasing force to enable the control member to move from the second position to the first position.

The control member may be capable of sliding between the first position and the second position along a linear path.

The hedge trimmer may further include a damping member. The damping member is disposed between a first rotation connection part of the first housing and a second rotation connection part of the second housing.

The first housing may be disposed with a plurality of recesses for facilitating the control member to lock a relative position of the first housing and the second housing. As far as the circumferential direction of the rotation axis is concerned, an angle difference of adjacent ones of the plurality of recesses is 15° or an integer times of 15°.

The second housing may have a first rotation position and a second rotation position with respect to the first housing. When the second housing is rotated to the first rotation position, a plane in which a longitudinal axis of the second handle locates is parallel to the longitudinal axis of the trimming blade. When the second housing is rotated to the second rotation position, the second handle is rotated with 90 degrees with respect to the first rotation position.

The second housing may be rotated to the second rotation position, the second handle and the battery pack respectively are located at two sides of a plane defined by an intersection of an axis of the electric motor with the longitudinal axis of the trimming blade.

The rotation axis and an axis of the electric motor are obliquely intersected.

The hedge trimmer may also include a first housing, formed or connected with a first handle and disposed with a first rotation connection part, a second housing, formed or connected with a second handle and disposed with a second rotation connection part being connected with the first rotation connecting part and rotatable around a rotation axis between a first rotation position and a second rotation position with respect to the first rotation connection part wherein a plane perpendicular to the rotation axis and a plane perpendicular to a longitudinal axis of a trimming blade are obliquely intersected, a transmission mechanism, combined to the first housing, a trimming blade, configured for being driven by the transmission mechanism to carry out a shearing motion, an electric motor, combined to the first housing and configured for driving the transmission mechanism, and a battery pack, combined to the second housing and configured for supplying power to the electric motor.

In the plane perpendicular to the longitudinal axis of the trimming blade, the first rotation connection part and the electric motor may be located at a same side of the trimming blade.

In the plane perpendicular to the longitudinal axis of the trimming blade, the first rotation connection part and the first handle may be located at a same side of the trimming blade.

When the second housing is rotated to the first rotation position, a plane in which a longitudinal axis of the second handle locates may be parallel to the longitudinal axis of the trimming blade. When the second housing is rotated to the second rotation position, the second handle is rotated 90 degrees with respect to the first rotation position.

The second handle may have a midsplit plane, and the second handle is at least partly symmetrical with respect to the midsplit plane. When the second housing is rotated to the first rotation position, the midsplit plane of the second handle is parallel to the longitudinal axis of the trimming blade.

Also, the second handle may have a midsplit plane, the second handle includes a main handle portion for facilitating a user to grip, and the main handle portion is disposed symmetrical with respect to the midsplit plane. When the second housing is at the second rotation position, in the midsplit plane, the main handle portion and a center of gravity of the battery pack respectively are located at two sides of the longitudinal axis of the trimming blade.

When the second housing is rotated to the first rotation position, in a direction parallel to the longitudinal axis of the trimming blade, the second handle may be rotated to the nearest position distant from the first handle. When the second housing is rotated to the second rotation position, a distance between the second handle and the first handle is greater than a distance between the second handle and the first handle when the second housing is rotated to the first rotation position.

When the second housing is rotated to the second rotation position, the second handle and the battery pack may be respectively located at two sides of the longitudinal axis of the trimming blade.

When the second housing is rotated to the second rotation position, the second handle and a center of gravity of the battery pack may be respectively located at two sides of a midsplit plane of the front or first handle.

When the second housing is rotated to the second rotation position, the second handle and the battery pack may be respectively located at two sides of a plane defined by intersection of an axis of the electric motor with the longitudinal axis of the trimming blade.

The hedge trimmer may also include an electric motor including a stator assembly and a rotor assembly, a transmission mechanism for being driven by the electric motor, a trimming blade for being driven by the transmission mechanism to perform shearing motion, an electric motor casing for accommodating the rotor assembly of the electric motor, and a tool housing assembly for facilitating the transmission mechanism and the electric motor casing to be formed into a whole. The tool housing assembly includes a first material part which at least is made of a first material. The electric motor casing includes a second material part which at least is made of a second material. The second material part is at least partly exposed outside the tool housing assembly.

The hedge trimmer may further include a transmission casing for accommodating the transmission mechanism. The transmission casing is exposed outside the tool housing assembly.

The transmission casing may be at least partly made of a metal material.

The second material part may be exposed outside the tool housing assembly from one side, and the transmission casing being exposed outside the tool housing assembly from the opposite side.

The transmission casing may include a transmission casing main body formed with an accommodating chamber and a plurality of transmission casing ribs outwardly protruding from the transmission casing main body. Each two transmission casing ribs forming an airflow channel therebetween.

The airflow channel may extend substantially along a direction parallel to an axis of the electric motor.

The electric motor casing may be disposed with a fan therein. The electric motor casing is formed with air outlets. Airflow produced by the fan enters into the electric motor casing from the airflow channel and then is exhausted out from the air outlets.

The tool housing assembly may be disposed with a circuit board therein. The tool housing assembly is formed with an air inlet. Airflow produced by the fan sequentially flows through the air inlet, the circuit board, the electric motor and the air outlets.

The hedge trimmer may further include a first handle located between the trimming blade and the electric motor. The first handle is fixed to the transmission casing.

The hedge trimmer may further include a battery pack for supplying power to the electric motor. The tool housing assembly includes a first housing and a second housing. The first housing is formed or connected with a first handle. The second housing is formed or connected with a second handle. The battery pack is combined to the second housing. The first housing and the second housing respectively include a first rotation connection part and a second rotation connection part for making them be rotatably connected and take a rotation axis as an axis. The second housing has a first rotation position and a second rotation position during being rotated with respect to the first housing. A plane perpendicular to the rotation axis and a plane perpendicular to a longitudinal axis of the trimming blade are obliquely intersected.

In the plane perpendicular to the longitudinal axis of the trimming blade, the first rotation connection part and the electric motor may be located at a same side of the trimming blade.

An electric motor device includes an electric motor casing formed with air outlets, a stator assembly, fixedly connected with the electric motor casing, a rotor assembly, rotatably connected with the stator assembly, a fan, disposed inside the electric motor casing, and a wind guide hood, accommodated in the electric motor casing. The wind guide hood includes airflow shield portions for stopping airflow produced by the fan spinning around inside the electric motor casing. The airflow shield portions are disposed between an inner wall of the electric motor casing and the fan.

The rotor assembly drives the fan to rotate. The airflow shield portions and the air outlets may be staggeredly arranged in the circumferential direction of an axis of rotation of the fan.

The airflow shield portions and the air outlets may be generally aligned in an axial direction of an axis of rotation of the fan.

The number of the airflow shield portions may be greater than or equal to 2, and at least two of the plurality of airflow shield portions are disposed with the air outlet therebetween.

The number of the airflow shield portions may greater than or equal to 2, and at least two of the a plurality of airflow shield portions are symmetrical with respect to an axis of rotation of the fan.

The wind guide hood may further include a connecting portion connected with the plurality of airflow shield portions and a surrounding portion disposed surrounding the rotor assembly. The surrounding portion and the connecting portion respectively are located two sides of the fan.

The surrounding portion may be formed with a buckle, and the buckle is connected with the electric motor casing.

A gap between the surrounding portion and the electric motor may be greater than or equal to 0.3 mm and smaller than or equal to 3 mm.

The hedge trimmer may include any one of the above electric motor devices.

The hedge trimmer may further include a first housing and a second housing. The first housing is formed or connected with a first handle. The second housing is formed or connected with a second handle. The battery pack is combined to the second housing and for supplying power to outer rotor electric motor. The first housing and the second housing respectively include a first rotation connection part and a second rotation connection part for making them be connected and rotatable around a rotation axis. The second housing has a first rotation position and a second rotation position during being rotated with respect to the first housing. A plane perpendicular to the rotation axis is obliquely intersected with a plane perpendicular to the longitudinal axis of the trimming blade.

DETAILED DESCRIPTION

Figure 1:
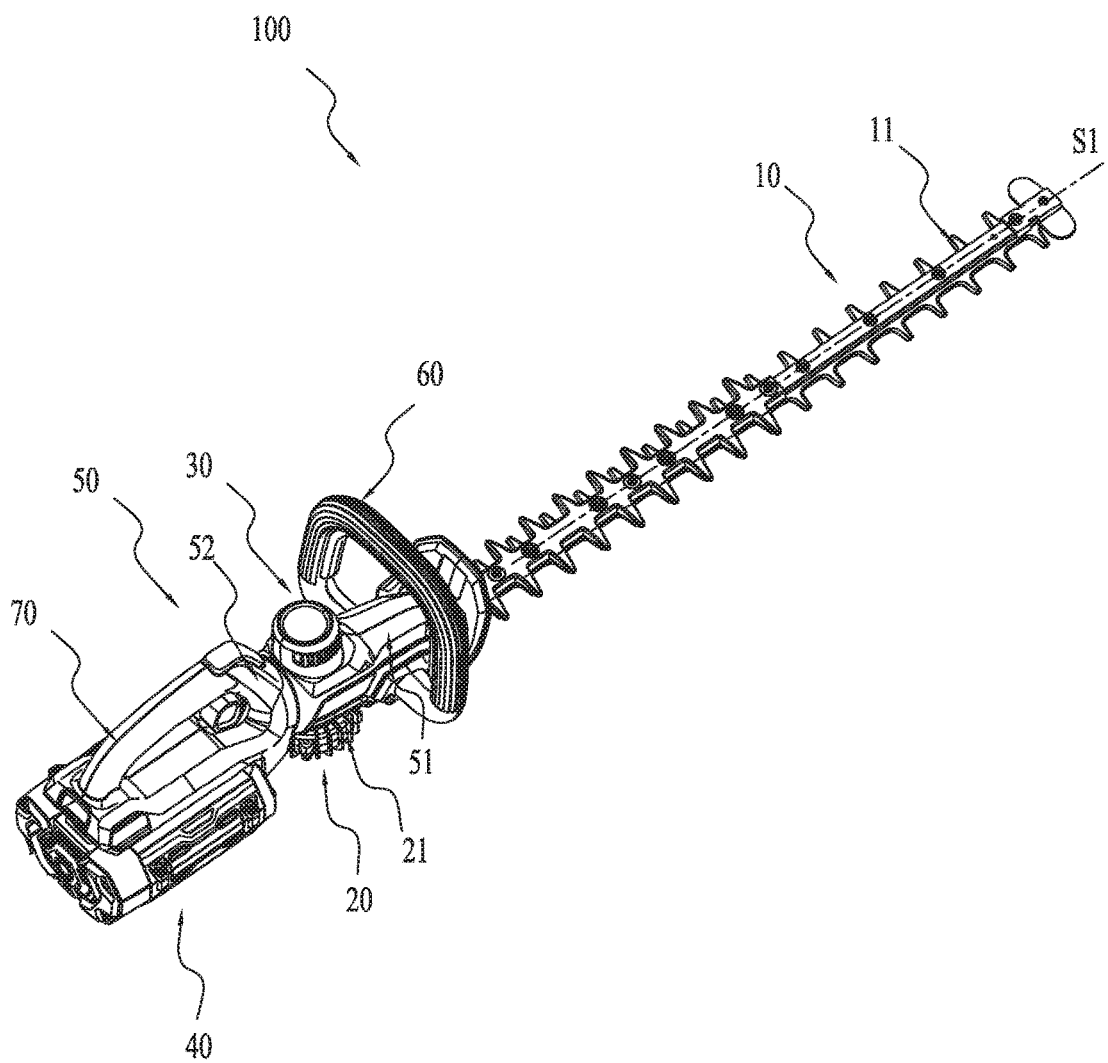
FIG. 1 is a schematic view of an exemplary hedge trimmer.

Referring to FIG. 1, a hedge trimmer 100 includes a trimming blade 10, a transmission mechanism 20, an electric motor 30, a battery pack 40, a tool housing assembly 50, a first handle 60 and a second handle 70.

The trimming blade 10 is configured to perform a shearing movement so as to achieve a tool function. The trimming blade 10 extends substantially along one direction, a size of the trimming blade 10 in the direction is much greater than its sizes in the other directions, and the direction is defined as the lengthwise direction of the trimming blade 10. As illustrated in FIG. 1, the trimming blade 10 defines a longitudinal axis S1, and the longitudinal axis S1 is parallel to the lengthwise direction of the trimming blade 10.

A main body of the trimming blade 10 substantially extends along the longitudinal axis S1. A plurality of (i.e., more than one) cutting edges 11 are formed at opposite sides of the main body of the trimming blade 10 and each of the plurality of cutting edges 11 protrudes from the main body of the trimming blade 10 along a direction perpendicular to the longitudinal axis S1. A size in the direction perpendicular to the longitudinal axis S1 is a width of the trimming blade 10.

A size of the trimming blade 10 in another direction perpendicular to the longitudinal axis S1 is relatively small, so that the trimming blade 10 is a substantially laminar structure.

Generally speaking, the cutting edges 11 may be disposed at one side of the longitudinal axis S1 of the trimming blade 10, or may be disposed at two sides of the longitudinal axis S1 of the trimming blade 10. In particular, as shown in FIG. 1, the cutting edges 11 extend outwardly from the two sides of the longitudinal axis S1.

The transmission mechanism 20 is connected with the trimming blade 10 and for driving the trimming blade 10 to do reciprocating motion. A transmission casing 21 accommodates the transmission mechanism 20 therein. Herein, accommodating the transmission mechanism 20 means accommodating all of the transmission mechanism 20 or accommodating a part of the transmission mechanism 20.

The electric motor 30 is connected with the transmission mechanism 20 for driving the transmission mechanism 20.

The battery pack 40 is for supplying the electric motor 30 with electric power. The battery pack 40 for example includes a plurality of rechargeable battery cells.

The tool housing assembly 50 is for assembling various parts of the hedge trimmer 100 into a whole and includes a first housing 51 and a second housing 52.

Figure 2:
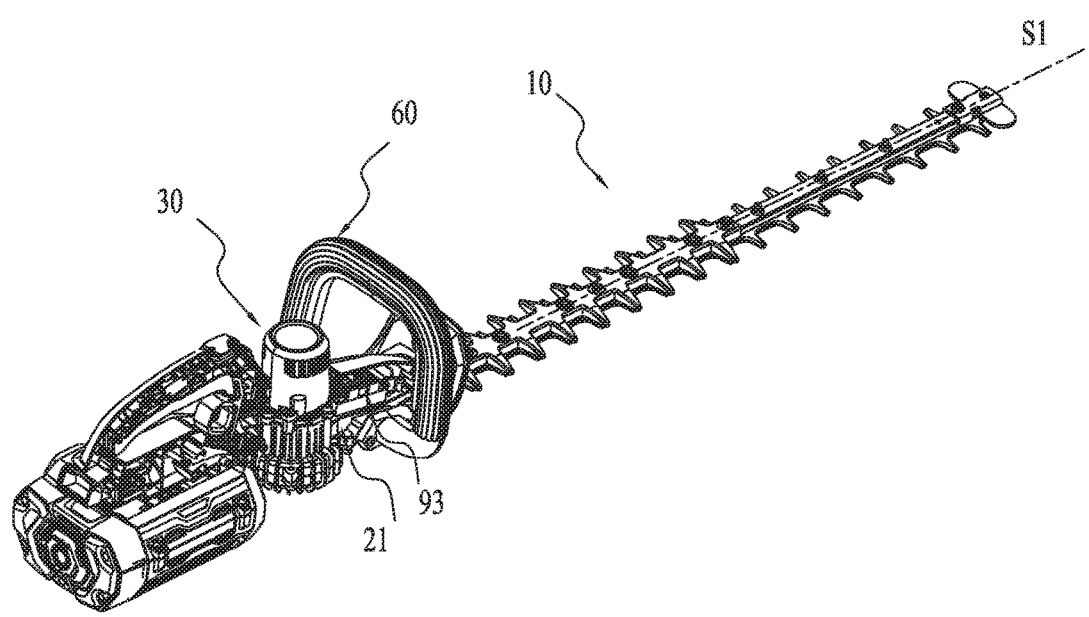
FIG. 2 is a schematic view of the hedge trimmer in FIG. 1 after a part of the housing is removed.

The first housing 51 is formed or connected with the first handle 60, the second housing 52 is formed or connected with the second handle 70, the first handle 60 and the second handle 70 each are for being gripped in one hand by the user, i.e., the first handle 60 is for the user to grip by one hand, and the second handle 70 is for the user to grip by the other hand. Herein, the term "formed" means the handle is a part of the housing, and the term "connected" means directly or indirectly connected, i.e., the handle is directly connected to the housing or the handle is indirectly connected to the housing by other structure. In FIG. 1, the transmission mechanism 20 and the electric motor 30 are combined to the first housing 51, i.e., the transmission mechanism 20 and the electric motor 30 are fixed relative to the first housing 51, they may be directly fixed to the first housing 51, or indirectly fixedly connected to the first housing 51 via other structure. Moreover, the second housing 52 is formed with the second handle 70, and the battery pack 40 is removably/detachably connected to the second housing 52. The first handle 60 is an individual/separate part and located between the trimming blade 10 and the electric motor 30. In particular, as shown in FIG. 2, in the direction of the longitudinal axis S1 of the trimming blade 10, the first handle 60 is located between the trimming blade 10 and the electric motor 30. The first handle 60 is fixed to the transmission casing 21. Generally speaking, for a traditional hedge trimmer 100, its first handle 60 is fixed to the tool housing assembly 50, after working for a long time, the trimming blade 10 would produce wobble relative to the tool housing assembly 50, the operator grips the first handle 60 fixed onto the tool housing assembly 50, the first handle 60 would produce wobble relative to the trimming blade 60, which would interfere with the use of tool for the user and affect cutting accuracy. Because when the user grips the tool, a total weight is applied onto the first handle 60 by the tool housing assembly 50, the wobble of the tool housing assembly 50 would greatly affect the service life of the tool. By fixing the first handle 60 to the transmission casing 21 as proposed herein, it can avoid the wobble between the trimming blade 10 and the first handle 60, meanwhile most of the weight is directly applied onto the first handle 60 by the transmission mechanism 20, service life of the tool is increased consequently.

Figure 3:
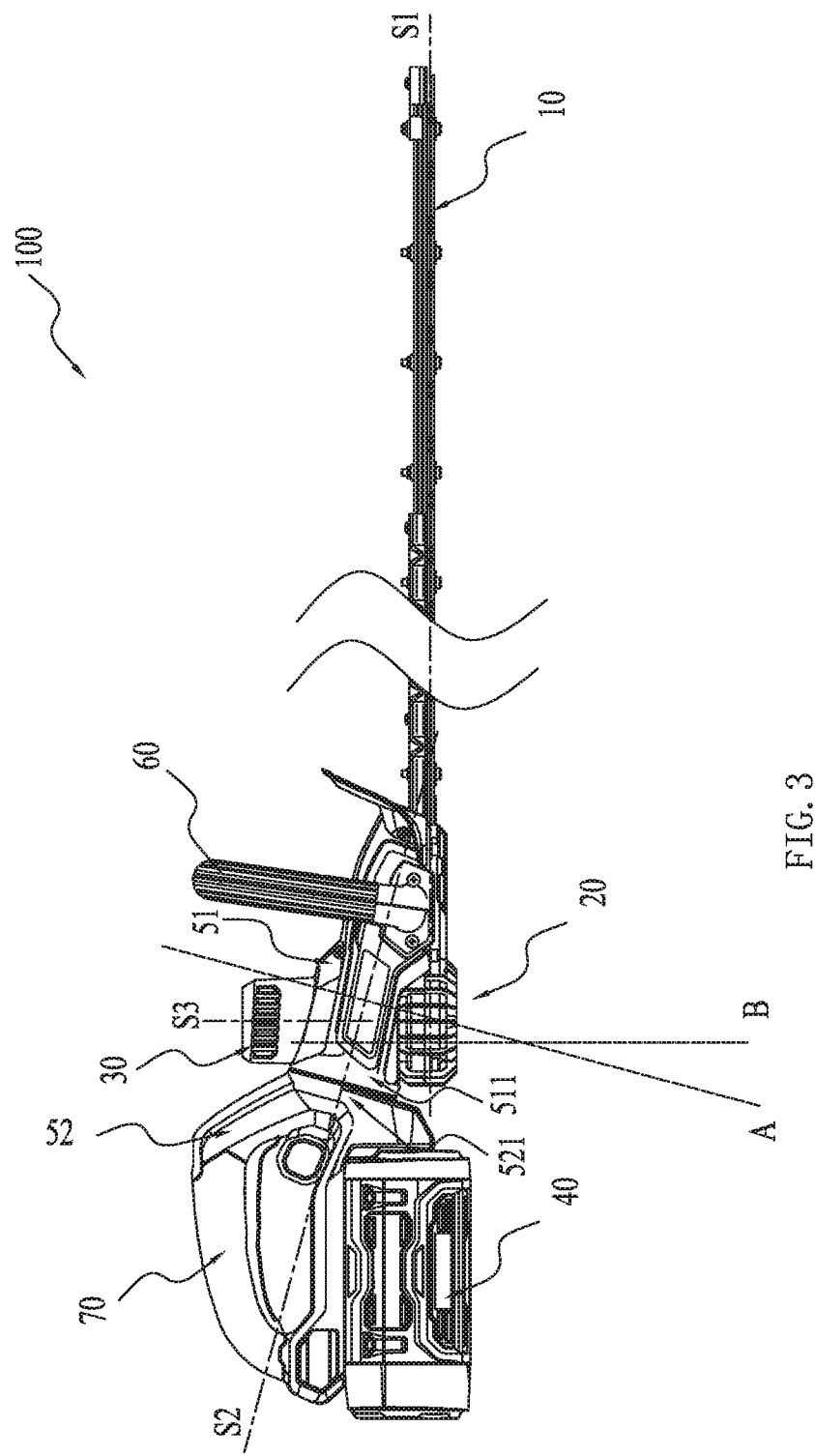
FIG. 3 is a schematic view of a second housing of the hedge trimmer in FIG. 1 being at a first rotation position.

As illustrated in FIG. 3, the first housing 51 includes a first rotation connection part 511, the second housing 52 includes a second rotation connection part 521, the first rotation connection part 511 and the second rotation connection part 521 are rotatably connected and thereby the first housing 51 and the second housing 52 can rotate along a rotation axis S2. When the first housing 51 and the second housing 52 are rotated with respect to each other, the electric motor 30, the transmission mechanism 20, the first handle 60 and the first housing 51 together are rotated with respect to the second housing 52, the battery pack 40, the second handle 70 and the second housing 52 together are rotated with respect to the first housing 51.

A plane A perpendicular to the rotation axis S2 and a plane B perpendicular to the longitudinal axis S1 of the trimming blade 10 are obliquely intersected with each other. The plane A perpendicular to the rotation axis S2 and the plane B perpendicular to the extending direction of the trimming blade 10 are obliquely intersected with each other. Furthermore, the rotation axis S2 and the trimming blade 10 are obliquely intersected. Specifically, the plane A perpendicular to the rotation axis S2 and the plane B perpendicular to the longitudinal axis S1 of the trimming blade 10 are intersected with an angle of 15°. The angle may be greater than or equal 10° and smaller than or equal to 45°.

In the plane B perpendicular to the longitudinal axis S1 of the trimming blade 10, the first rotation connection part 511 and the electric motor 30 are located at a same side of the trimming blade 10, i.e., the first rotation connection part 511 is away from the longitudinal axis S1 of the trimming blade 10. Specifically, an intersection point of the rotation axis S2 between the first rotation connection part 511 and the second rotation connection part 521 is deviated from the longitudinal axis S1 of the trimming blade 10.

In the plane B perpendicular to the longitudinal axis S1 of the trimming blade 10, the first rotation connection part 511 and the first handle 60 are located at a same side of the blade of the hedge trimmer 100. The first rotation connection part 511 and the first handle 60 are located at a same side of the trimming blade 10 such that the first rotation connection part 511 and a gripping portion of the first handle 60 are located at the same side of the trimming blade 10. The trimming blade 10 defines a shearing plane, and the first rotation connection part 511 and the electric motor 30 are located at a same side of the shearing plane. The first rotation connection part 511 and the first handle 60 are located at a same side of the shearing plane.

The rotation axis S2 and an axis S3 of the electric motor 30 are obliquely intersected. An intersection point of the rotation axis S2 with the axis S3 of the electric motor 30 and the second rotation connection part 521 are located at a same side of the trimming blade 10. A distance from the intersection point of the rotation axis S2 between the first rotation connection part 511 and the second rotation connection part 521 to the trimming blade 10 is greater than a distance from the intersection point of the rotation axis S2 with the axis S3 of the electric motor 30 to the trimming blade 10. A distance from the intersection point of the rotation axis S2 with the axis S3 of the electric motor 30 to the longitudinal axis S1 of the trimming blade 10 is greater than or equal to 20 mm and smaller than or equal to 60 mm. A distance from the intersection point of the rotation axis S2 between the first rotation connection part 511 and the second rotation connection part 521 to the longitudinal axis S1 of the trimming blade 10 is greater than or equal to 30 mm and smaller than or equal to 70 mm.

Figure 4:
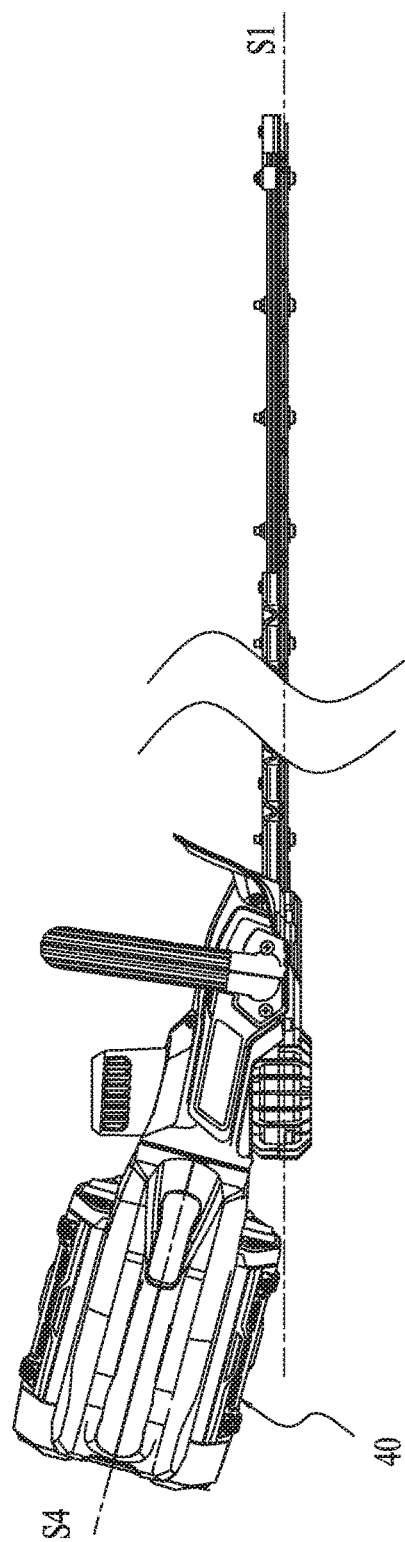
FIG. 4 is a schematic view of the second housing of the hedge trimmer in FIG. 1 being at a second rotation position.

The plane A perpendicular to the rotation axis S2 and the plane B perpendicular to the longitudinal axis S1 of the trimming blade 10 are obliquely intersected, so that when the second housing 52 is rotated with an angle of 90° relative to the first housing 51, as illustrated in FIG. 4, the battery pack 40 can be away from the trimming blade 10, which can avoid interference with the work in the course of working resulting from excessively large volume of the battery pack 40 as well as can avoid damage to the battery pack 40.

Figure 5:
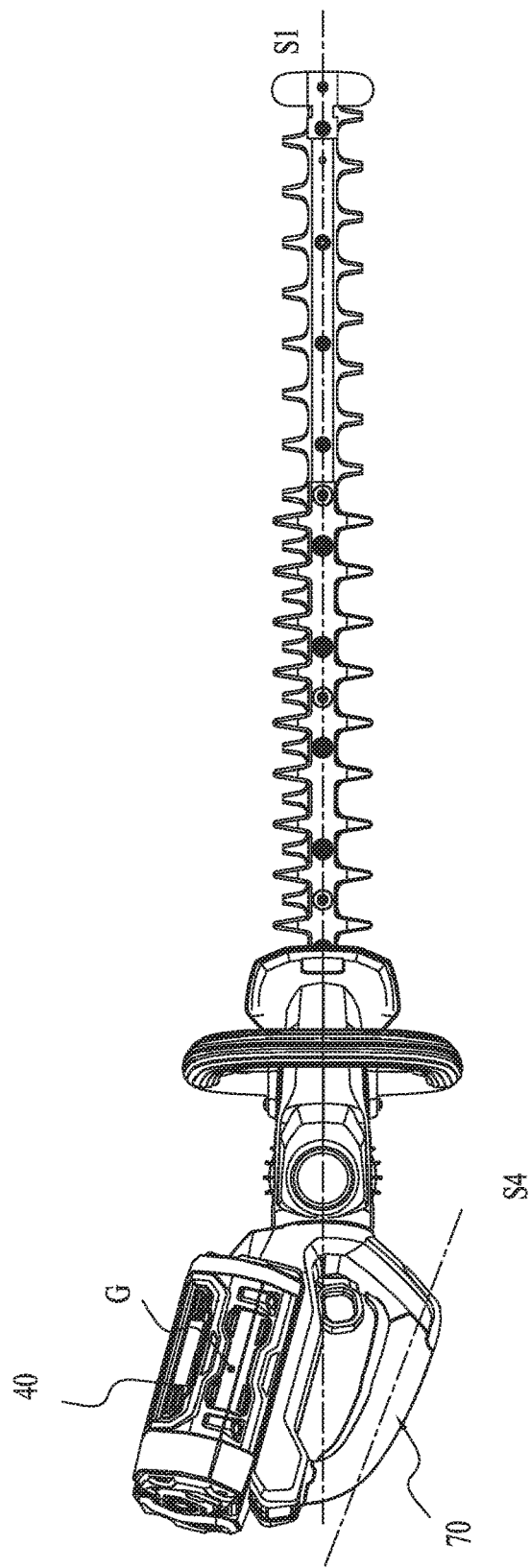
FIG. 5 is another perspective view of the second housing of the hedge trimmer in FIG. 1 being at the second rotation position.

The second housing 52 has a first rotation position and a second rotation position with respect to the first housing 51. The first rotation position is shown in FIG. 3, and the second rotation position is shown in FIG. 4 and FIG. 5. The first rotation position acts as an initial position of the second housing 52, i.e., the most commonly used working position of the hedge trimmer 100. As to the first rotation position, at this situation, a plane in which a longitudinal axis S4 of the second handle 70 locates is parallel to the longitudinal axis S1 of the trimming blade 10, the term "parallel" herein includes the longitudinal axis S1 of the trimming blade 10 being located in the plane in which the longitudinal axis S4 of the second handle 70 locates.

The second handle 70 includes a main handle portion configured (i.e., structured and arranged) for facilitating the user to grip and control the hedge trimmer 100. When the user uses the second handle 70 and grips the main handle portion, the user can touch buttons and switches disposed in the vicinity thereof. More specifically, the main handle portion is symmetrical with respect to a plane, and such plane is defined as an equatorial plane (also referred to as midsplit plane) C of the second handle 70. The second handle 70 may be disposed symmetrical with respect to the equatorial plane C, or may be disposed partly symmetrical relative to the equatorial plane C. The mirror-symmetrical portion of the second handle 70 may include but not be limited to the main handle portion. The longitudinal axis S4 of the second handle 70 is located in the equatorial plane C of the second handle 70.

When the second housing 52 is rotated to the second rotation position, the second handle 70 is rotated 90 degrees relative to the first rotation position. Moreover, the second housing 52 may be rotated with respect to the first housing 51 and fixed to different positions to meet user's requirements in a variety of working environments. As far as the circumferential direction of the rotation axis S2 is concerned, an angle difference between adjacent rotation positions is set to be 15° or an integer times of 15°. When the second handle 70 is rotated 90° it reaches the second rotation position and can satisfy the need of the user to carry out vertical trimming.

When the second housing 52 is at the first rotation position, in the direction parallel to the longitudinal axis S1 of the trimming blade 10, the second handle 70 is rotated to the nearest position distant from the first handle 60. When the second housing 52 is rotated to the second rotation position, a distance between the second handle 70 and the first handle 60 is greater than a distance between the second handle 70 and the first handle 60 when the second housing 52 is rotated to the first rotation position.

When it is at the second rotation position, a distance of the first handle 60 relative to the second handle 79 is greater than the distance when it is at the first rotation position. The rotation axis S2 is inclined to the trimming blade 10, after the second housing 52 is rotated, the distance between the first handle 60 and the second handle 70 is increased, which makes the user be more comfortable for gripping the second handle 70 after being rotated.

The longitudinal axis S4 of the second handle 70 is in the equatorial plane C of the second handle 70. The symmetric plane of the second handle 70 is the equatorial plane C of the second handle 70.

As illustrated in FIG. 5, when the second housing 52 is at the second rotation position, in the plane in which the longitudinal axis S4 of the second handle 70 locates, the second handle 70 and a center of gravity of the battery pack 40 respectively are located at two sides of the longitudinal axis S1 of the trimming blade 10.

The plane in which the longitudinal axis S4 of the second handle 70 locates is the equatorial plane C of the second handle 70. Moreover, when it is at the second rotation position, the second handle 70 and the battery pack 40 respectively are located at two sides of the longitudinal axis S1 of the trimming blade 10. Specifically, the second rotation position is a position of being rotated with 90° relative to the first rotation position.

When it is at the second rotation position, the second handle 70 and the center of gravity G of the battery pack 40 respectively are located at two sides of the equatorial plane of the first handle 60. The first handle 60 at least includes a mirror-symmetrical portion, and a symmetric plane defined by the portion is the equatorial plane of the first handle 60.

When it is at the second rotation position, the second handle 70 and the battery pack 40 respectively are located at two sides of a plane defined by intersection of the axis of the electric motor 30 and the longitudinal axis S1 of the trimming blade 10.

Figure 6:
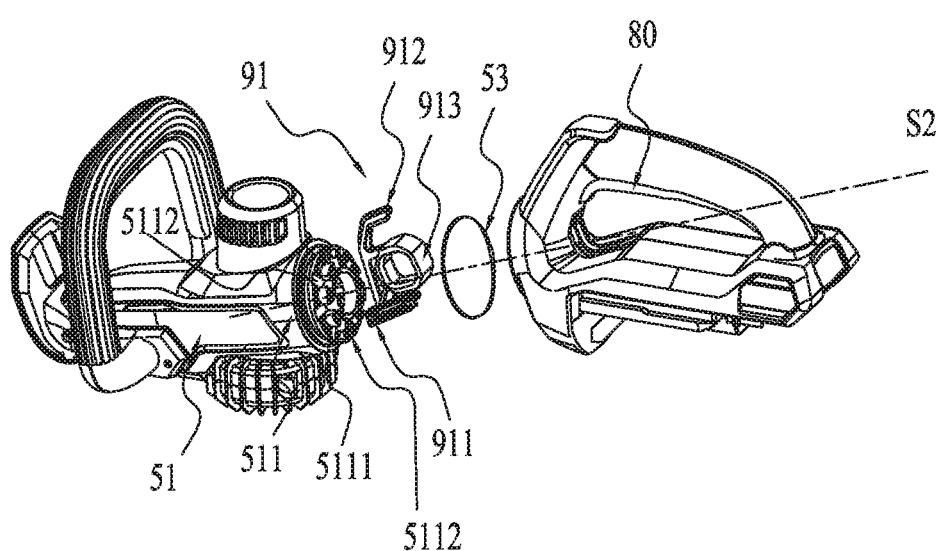
FIG. 6 is a partial exploded view of the hedge trimmer in FIG. 1.

As illustrated in FIG. 6, the second housing 52 can be rotated around the rotation axis S2 with respect to the first housing 51, and the first housing 51 includes a first locking portion 5111. The first locking portion 5111 may be formed by the first rotation connection part 511.

The hedge trimmer 100 further includes a control member 91, and the control member 91 is for locking a position of the second housing 52 relative to the first housing 51. The control member 91 includes a second locking portion 911, and the second locking portion 911 is matched with the first locking portion 5111. The control member 91 is movably connected to the first housing 51 or the second housing 52. In particular, the control member 91 is movably connected to the second housing 52. The control member 91 has a first position and a second position with respect to the second housing 52, and furthermore the control member 91 and the second housing 52 together are rotatable with respect to the first housing 51.

Figure 7:
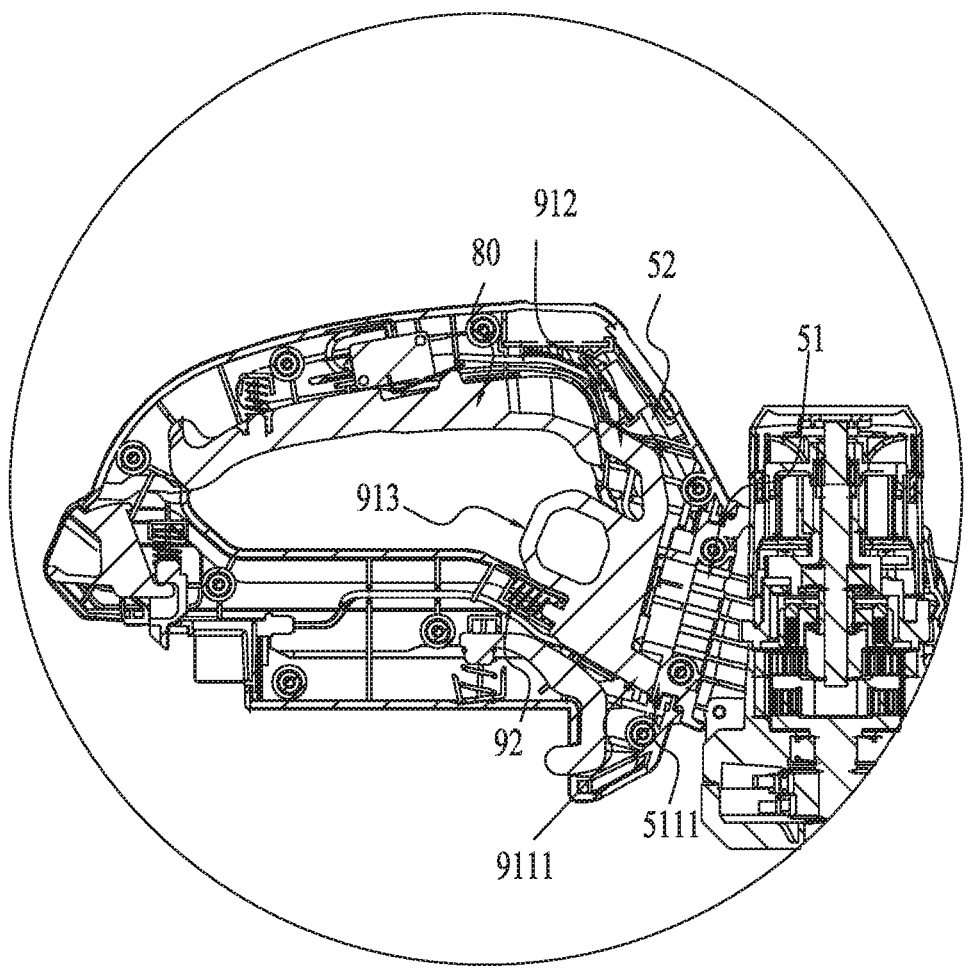
FIG. 7 is a schematic view of a control member of the hedge trimmer in FIG. 1 being at a first position.

As illustrated in FIG. 7, when the control member 91 is at the first position, the first locking portion 5111 and the second locking portion 911 are engaged with each other, and the second housing 52 is fixed to the first housing 51, i.e., the second housing 52 cannot be rotated around the rotation axis S2 with respect to the first housing 51.

Figure 8:
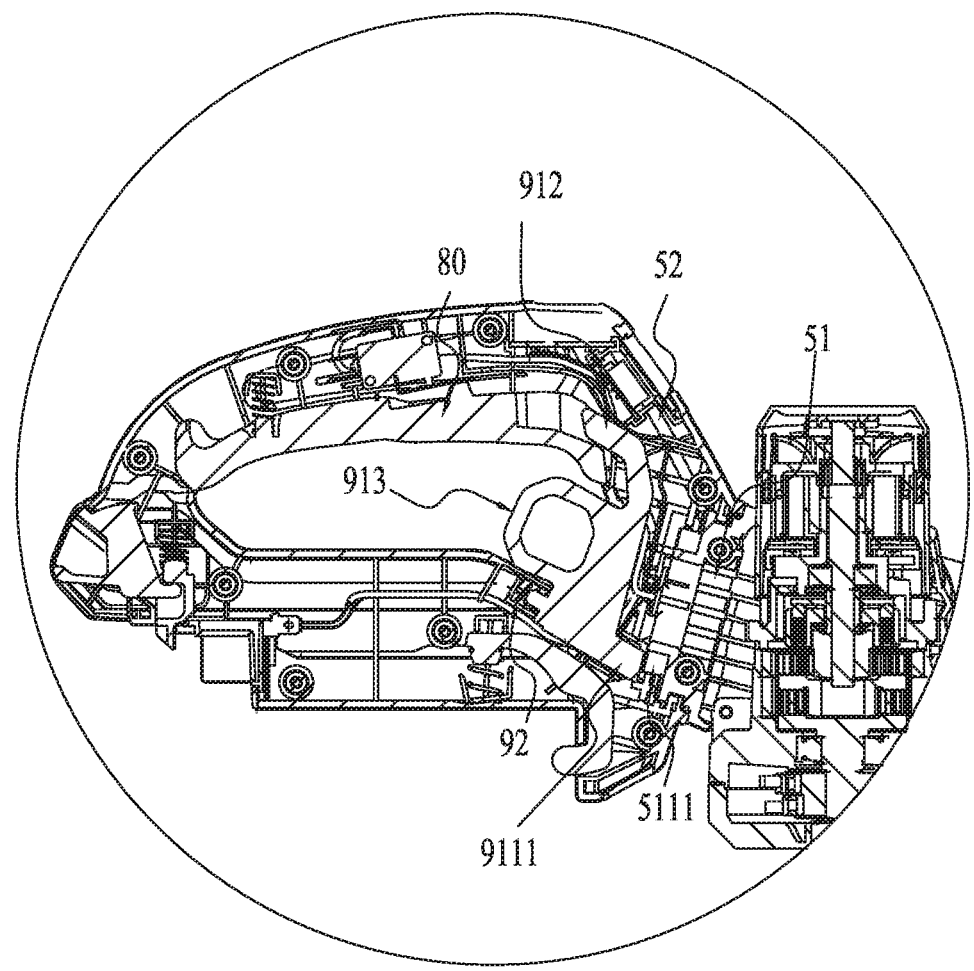
FIG. 8 is a schematic view of the control member of the hedge trimmer in FIG. 1 being at a second position.

As illustrated in FIG. 8, when the control member 91 is at the second position, the first locking portion 5111 and the second locking portion 911 are disengaged, and therefore the second housing 51 is allowed to rotate around the rotation axis S2 with respect to the first housing 51.

The hedge trimmer 100 further includes a trigger 80 for controlling the electric motor 30.

The control member 91 includes a stopper portion 912, as shown in FIG. 8, when the control member 91 is at the second position. The stopper portion 912 stops the movement of the trigger 80. In FIG. 8, the trigger 80 is blocked by the stopper portion 912 and thus cannot upwardly move. When the second housing 52 is allowed to rotate with respect to the first housing 51, it can avoid the electric motor to be started by mistaken manipulation and thus have relatively high safety performance. In FIG. 7, when the control member 91 is at the first position, the trigger 80 can be started, and the position shown in the drawing is the position of the trigger 80 being pressed to start.

The control member 91 further includes a manipulating portion 913. The user can manipulate the manipulating portion 913 to enable the control member 91 to move between the first position and the second position. The first locking portion 5111 is formed with a recess 5112, and the second locking portion 911 is formed with a protrusion 9111 matched with the recess 5112. The engagement of the protrusion 9111 with the recess 5112 realizes the locking. When the user manipulates the control member 91, the control member 91 is moved to the first position, the protrusion 9111 of the second locking portion 911 is located in the recess 5112 of the first locking portion 5111. The first locking portion 5111 and the second locking portion 911 cannot be rotated with respect to each other, i.e., the first housing 51 and the second housing 52 cannot produce relative rotation. When the user manipulates the control member 91 to make it be moved to the second position, the protrusion 911 and the recess 5112 at this time are disengaged, i.e., they cannot block the relative rotation between the first housing 51 and the second housing 52. As illustrated in FIG. 6, the number of the recess 5112 is multiple, and each recess 5112 is corresponding to one relative position of the first housing 51 and the second housing 52. As illustrated in FIG. 6, the number of the recesses 5112 is eight, and the eight recesses 5112 are respectively corresponding to eight angles, for example, 0°, −45°, 45°, −135°, 135°, −90°, 90° and ±180° at a circumferential direction around the rotation axis S2.

As illustrated in FIG. 7 and FIG. 8, the manipulating portion 913 is located between the second handle 70 and the battery pack 40. Moreover, the trigger 80 and the manipulating portion 913 are located at a same side of the second handle 70, and the reasonable use of space can achieve compact structure.

The hedge trimmer 100 further includes a biasing member 92 fixedly connected to the second housing 52 and for applying a biasing force to enable the control member 91 to move from the second position to the first position. The biasing member 92, as a member for generating biasing force, may be a spring, a magnet and so on. In the illustrated embodiment, the biasing member 92 is a spring and is connected to the second housing 52 and the control member 91, so as to ensure that when the control member 91 is at the first position the control member 91 can be kept at the first position, and therefore avoid the user's mistaken manipulation to cause the generation of relative rotation between the first housing 51 and the second housing 52.

The control member 91 is capable of sliding between the first position and the second position along a linear path. The control member 91 has advantages of simple operation, short sliding path and quick operation.

As illustrated in FIG. 6, the hedge trimmer 100 further includes a damping member 53, and the damping member 53 is disposed between the first rotation connection part 511 and the second rotation connection part 521. The trimming blade 10 and the electric motor 30 are fixed to the first housing 51 and would produce vibration during working, the damping member 53 can effectively reduce the vibration delivered to the second housing 52, so that the vibration on the second handle 70 is reduced and it is comfortable for user to operate.

The first housing 51 is disposed with a plurality of gear structures to enable the control member 91 to lock a relative position of the first housing 51 and the second housing 52. As far as the circumferential direction of the rotation axis S2 is concerned, an angle difference of successive gear structures is 15° or an integer times of 15°, i.e., the second housing 52 can be locked to an angle of 15° or an integer times of 15° with respect to the first housing 51.

Figure 9:
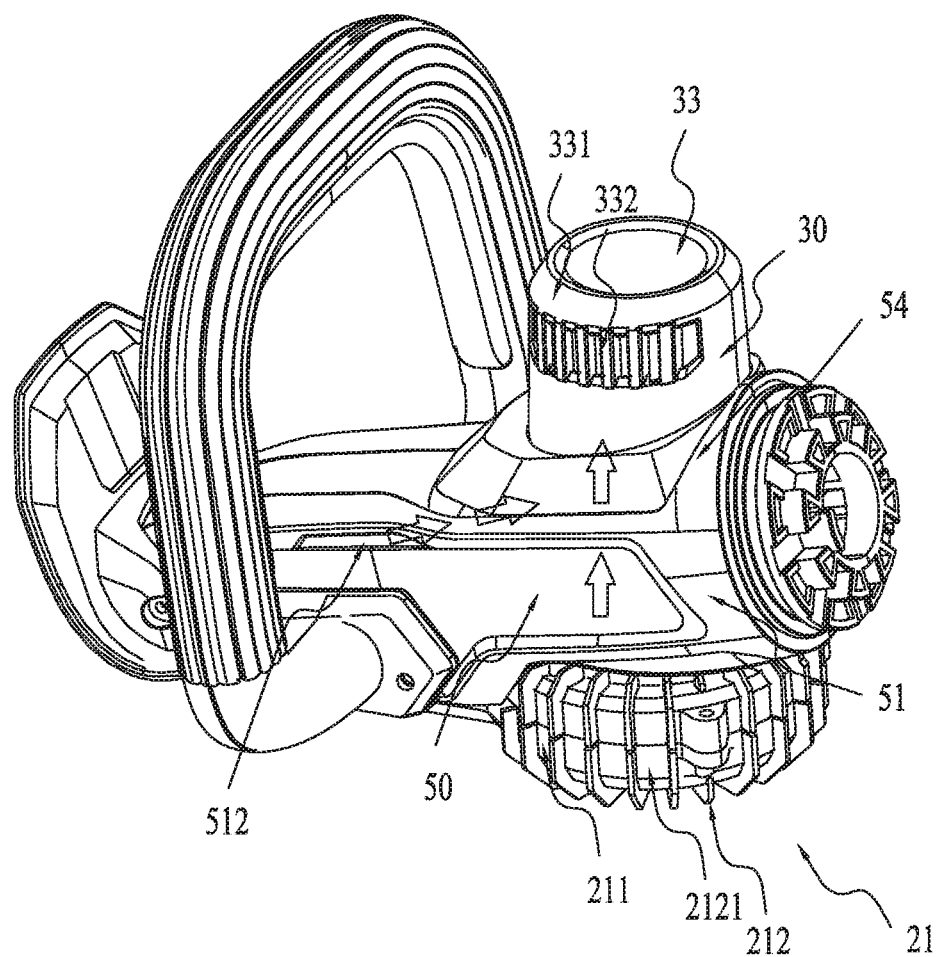
FIG. 9 is a schematic view of airflow associated with the hedge trimmer in FIG. 1.

As illustrated in FIG. 9, the hedge trimmer 100 further includes an electric motor casing 33, and the electric motor casing 33 accommodates the electric motor 30 therein. The tool housing assembly 50 includes a first material part 54, and the first material part 54 at least is made of a first material. As shown in FIG. 9, the first housing 51 includes the first material part 54. The electric motor casing 33 includes a second material part 331, and the second material part 331 at least is made of a second material. The first material part 54 may be the whole of the tool housing assembly 50, or may be a part of the tool housing assembly 50. The first housing 51 may be made of the first material. A thermal conductivity of the first material is low, and a thermal conductivity of the second material is high, that is, the thermal property of the second material is stronger than the thermal property of the first material. The first material part 54 is made of the first material with low thermal conductivity, and the second material part 331 is made of the second material with high thermal conductivity. More specifically, the first material is plastic, and the second material is metal.

The second material part 331 is at least partially exposed outside the tool housing assembly 50, i.e., all or a part of the second material part 331 is exposed outside the tool housing assembly 50, or the second material part 331 protrudes out of or pierces the tool housing assembly 50.

The tool housing assembly 50 of a commonly used hedge trimmer 100 directly wraps the electric motor 30 and is made of one material such as plastic, however the plastic has a low thermal conductivity and thus the heat dissipating effect is poor. The electric motor 30 is located in the plastic material, so that it is easy to cause damage of the electric motor 30 resulting from excessively high temperature. For the purpose of heat dissipating, the tool housing assembly 50 is formed as a metal piece, which would lead to the whole weight is large, the hedge trimmer 100 as a kind of handheld tool, it is not easy for the operator to carry and manipulate if its weight is excessively large.

Accordingly, the tool housing assembly 50 in the illustrated embodiment does not directly wrap the electric motor 30 and the individual electric motor casing 33 is disposed to accommodate the electric motor 30 therein. Moreover, the electric motor casing 33 adopts a material with high thermal conductivity, and thus can rapidly dissipate heat generated from the electric motor 30 and thereby reduce the temperature of the electric motor 30. The tool housing assembly 50 employs a material with low thermal conductivity to achieve thermal insulation effect and avoid damage to the human body caused by high temperature. The second material part 331 of the electric motor casing 33 is exposed outside or protrudes out of the tool housing assembly 50, which can increase contact area of the second material part 331 with air and thereby accelerate heat dissipation of the electric motor 30.

The transmission casing 21 is exposed outside the tool housing assembly 50. The phase "exposed outside" means at least partly locates outside the tool housing assembly 50. As a result, compact structure is realized, the volume of the tool housing assembly 50 is reduced and the weight is also reduced, which facilitate the user to carry.

The transmission casing 21 is at least partly made of a metal material. The transmission casing 21 made of the metal material can accelerate heat dissipation, and is in favor of lowering the temperature of the hedge trimmer 100. The transmission casing 21 is exposed outside the tool housing assembly 50, which can increase the contact area with the air and thereby improve cooling effect.

The second material part 331 is exposed outside the tool housing assembly 50 from one side, and the transmission casing 21 is exposed outside the tool housing assembly 50 from the opposite side. Or, the electric motor casing 33 and the transmission casing 21 protrude out of the tool housing assembly 50 from opposite sides of the tool housing assembly 50. In particular, as illustrated in FIG. 9, the electric motor housing 33 and the transmission casing 21 protrude out of the first housing 51 from opposite sides of the first housing 51.

Figure 10:
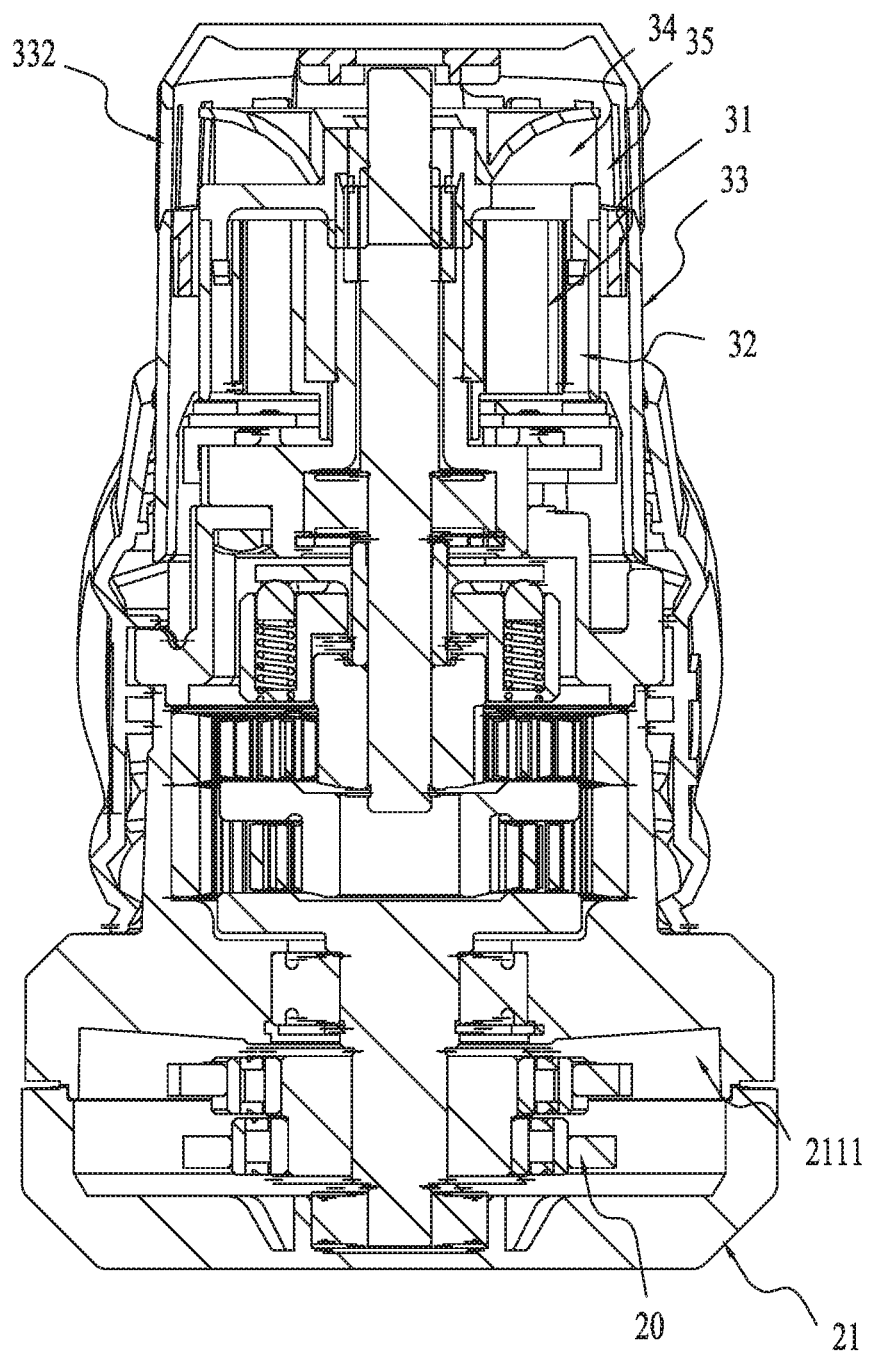
FIG. 10 is a cross-sectional view of the hedge trimmer in FIG. 1.

In FIG. 9, the transmission casing 21 includes a transmission casing main body 211 and transmission casing ribs 212. As illustrated in FIG. 10, the transmission housing main body 211 is formed with an accommodating chamber 2111, and the accommodating chamber 2111 accommodates/receives the transmission mechanism 20 therein. As shown in FIG. 9, a plurality of transmission casing ribs 212 are formed protruding outwardly from the transmission casing main body 211, and each two adjacent transmission casing ribs 212 form an airflow channel therebetween. In particular, the airflow channel 2121 extends substantially along a direction parallel to the axis of the electric motor 30. That is, airflow can flow from the side of the transmission casing 21 being located to the side of the electric motor casing 33 being located along the airflow channel 2121.

Figure 11:
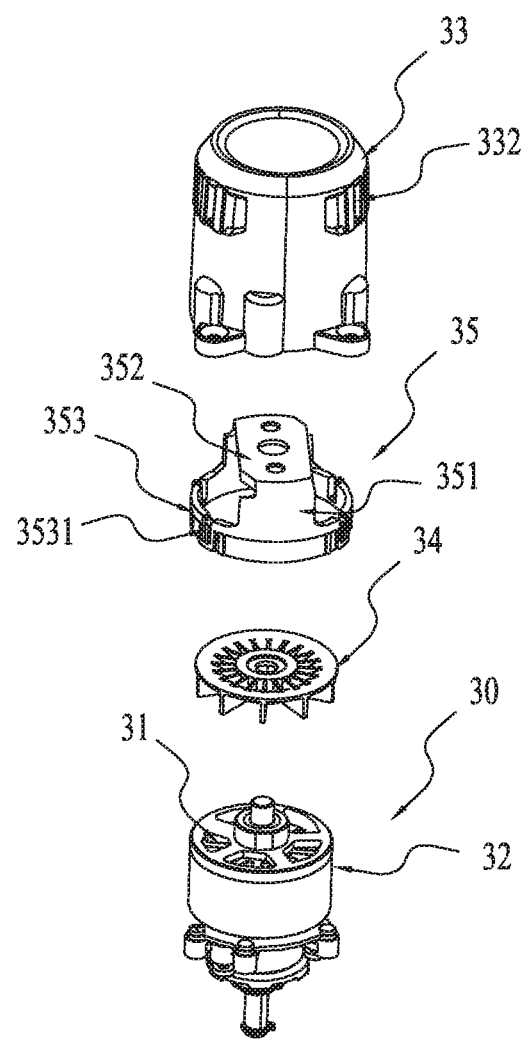
FIG. 11 is an exploded view of a part of structure of the hedge trimmer in FIG. 1.

As illustrated in FIG. 9 through FIG. 11, the electric motor casing 33 has a fan 34 disposed therein. The electric motor casing 33 is formed with air outlets 332, and the electric motor 30 drives the fan 34 to rotate. As denoted by the arrows in FIG. 9, airflow produced by the fan 34 would enter into the electric motor casing 33 from the airflow channel 2121 and then be exhausted out from the air outlets 332.

As illustrated in FIG. 2, the tool housing assembly 50 is disposed with a circuit board 93 therein, and the circuit board 93 can achieve an electrical connection between the electric motor 30 and the battery pack 40. The circuit board 93 is disposed inside the first housing 51 and locates on the front of the electric motor 30. That is, in the direction of the longitudinal axis S1 of the trimming blade 10, the circuit board 93, the electric motor 30, the battery pack 40 and sequentially arranged in that order; or in the direction of the longitudinal axis S1 of the trimming blade 10, the circuit board 93, the electric motor 30 and the second housing 52 are sequentially arranged in that order. As shown in FIG. 9, the tool housing assembly 50 is formed with an air inlet 512, as denoted by the arrows in FIG. 9, airflow produced by the fan 34 sequentially flows through the air inlet 512, the circuit board 93, the electric motor 30 and the air outlets 332.

As illustrated in FIG. 10 and FIG. 11, the electric motor 30 includes a stator assembly 31 and a rotor assembly 32. The rotor assembly 32 of the electric motor 30 is accommodated in the electric motor casing 33. The electric motor device includes the electric motor casing 33, the electric motor 30, the fan 34 and a wind guide hood 35. The rotor assembly 32 is rotatable with respect to the stator assembly 31 and the electric motor casing 33. The rotor assembly 32 is connected with the transmission mechanism 20, and the rotor assembly 32 rotates to drive the transmission mechanism 20. The fan 34 rotates along with the rotor assembly 32 of the electric motor 30. Commonly used electric motors 30 have many kinds, such as a direct current (DC) motor 30 and an alternating current (AC) motor 30. In particular, the electric motor 30 is an outer rotor electric motor and more specifically is an outer rotor brushless DC motor. The fan 34 is formed on or fixedly connected to the rotor assembly 32. That is, the fan 34 may be directly formed by the rotor assembly 32, or as an individual/separate part installed and fixed onto the rotor assembly 32. Furthermore, the fan 34 is fixedly connected to the rotor assembly 32. In particular, the fan 34 is a centrifugal fan.

During the electric motor 30 is working, the fan 34 rotates along with the rotor assembly 32 and brings airflow to move, and in particular the rotor assembly 32 drives the fan 34 to rotate. The electric motor 30 is accommodated in the electric motor casing 33, so that it is extremely easy to cause the airflow to spin around inside the electric motor casing 33 and cannot leave the electric motor casing 33, which would affect the cooling of the electric motor 30. In order to increase cooling efficiency, furthermore, the hedge trimmer 100 further includes the wind guide hood 35, the wind guide hood 35 locates inside the electric motor casing 33 and is fixed to the electric motor casing 33 and further is stationary relative to the electric motor casing 33. The wind guide hood 35 includes airflow shield portions 351, and the airflow shield portions 351 are for stopping airflow produced by the fan 34 whirling within the electric motor casing 33. The airflow shield portions 351 are disposed between an inner wall of the electric motor casing 33 and the fan 34. More specifically, the airflow shield portions 351 are located in a circumferential direction of rotation of the rotor assembly 32. The airflow shield portions 351 interrupt the whirling of the airflow in the electric motor casing 33, so as to promote the airflow to scatter and thereby increase cooling efficiency.

The electric motor casing 33 is formed with the air outlets 332. The airflow shield portions 351 and the air outlets 332 are staggeredly arranged in the circumferential direction of an axis of rotation of the fan 34. Specifically, the phase "staggeredly arranged" means that an arrangement in the circumferential direction of the axis of rotation of the fan 34 sequentially is the airflow shield portion 351, the air outlet 332, the airflow shield portion 351 and the air outlet 332. In the circumferential direction of the rotation of the rotor assembly 32, the air outlets 332 and the airflow shield portions 351 are connected. The airflow shield portions 351 and the air outlets 332 are basically aligned in the axial direction of the axis of rotation of the fan 34. In the axial direction of the rotor assembly 32, the air outlets 332 and the fan 34 have approximately equal heights.

The number of the airflow shield portions 351 is greater than or equal to 2, and at least two of the plurality of airflow shield portions 351 are symmetrical with respect to the axis of rotation of the fan 34. The wind guide hood 35 further includes a connecting portion 352, and the connecting portion 352 is connected with the plurality of airflow shield portions 351. At least two airflow shield portions 351 are connected by the connecting portion 352. The connecting portion 352 is fixed onto the top of the electric motor casing 33.

For an outer rotor electric motor, when a gap between the rotor assembly 32 and the electric motor casing 33 is excessively large, most of airflow would flow through the surface of the electric motor 30, but the airflow passing through the interior of the electric motor 30 is small, so that the cooling effect is poor. In order to reduce the gap between the electric motor 30 and the electric motor casing 33, the wind guide hood 35 further includes a surrounding portion 353, and the surrounding portion 353 is disposed surrounding the rotor assembly 32. The surrounding portion 353 and the connecting portion 34 are located at two sides of the fan 34 respectively. The surrounding portion 353 is formed with a buckle 3531, and the buckle 3531 is connected with the electric motor casing 33.

When a gap between the surrounding portion 353 and the electric motor 30 is excessively small, the cooling effect at the outer surface of the rotor assembly 32 becomes poorer, resulting in degraded cooling efficiency. When the gap between the surrounding portion 353 and the electric motor 30 is excessively large, the amount of airflow passing through the interior of the electric motor 30 becomes less, which also causes the cooling effect of the electric motor 30 to be poor. Furthermore, the gap between the surrounding portion 353 and the electric motor 30 is greater than or equal to 0.3 mm and smaller than or equal to 3 mm. Preferably, the gap between the surrounding portion 353 and the electric motor 30 is greater than or equal to 0.5 mm and smaller than or equal to 1.5 mm.

The basic principles, main features and advantages of the invention have been shown and described above. It should be understood to the skilled person in the art that the above embodiments do not limit the invention in any form, and any technical solution obtained in the way of equivalent replacement or equivalent transformation ought to be within the scope of protection of the invention.

What is claimed is:

1. A hedge trimmer comprising:
   an electric motor, the electric motor comprising a stator assembly and a rotor assembly;
   a transmission mechanism coupled to the electric motor and driven by the electric motor;
   a battery pack coupleable to the electric motor for supplying power to the electric motor;
   a trimming blade coupled to the transmission mechanism and driven by the transmission mechanism to perform a shearing motion;
   an electric motor casing for accommodating the rotor assembly of the electric motor;
   a tool housing assembly for accommodating the transmission mechanism and the electric motor casing;
   a first handle connected to the tool housing assembly and located between the trimming blade and the electric motor;
   a second handle connected to the tool housing assembly; and
   a transmission casing for accommodating the transmission mechanism;
   wherein the transmission casing is exposed outside the tool housing assembly, the battery pack is mounted to the tool housing assembly and positioned adjacent to the second handle, the tool housing assembly includes a first material part which at least is made of a first material, the electric motor casing includes a second material part which at least is made of a second material, the second material part is at least partly exposed outside the tool housing assembly, and a thermal conductivity of the second material is higher than a thermal conductivity of the first material, wherein the electric motor is at least partially located above of a chamber surrounded by the tool housing assembly, the transmission mechanism is at least partially located below the chamber surrounded by the tool housing assembly, at least a portion of the electric motor casing surrounds the electric motor located outside of the tool housing assembly, and at least a portion of the transmission casing surrounds the transmission mechanism located outside of the tool housing assembly, and wherein the electric motor casing is formed with air outlets, and the air outlets are located above the tool housing assembly.

2. The hedge trimmer as claimed in claim 1, wherein the first material comprises a plastic and the second material comprises a metal.

3. The hedge trimmer as claimed in claim 1, wherein the transmission casing is at least partly made of a metal material.

4. The hedge trimmer as claimed in claim 1, wherein the second material part is exposed outside the tool housing assembly from one side and the transmission casing is exposed outside the tool housing assembly from an opposite side.

5. The hedge trimmer as claimed in claim 1, wherein the transmission casing comprises a transmission casing main body formed with the chamber and a plurality of transmission casing ribs outwardly protruding from the transmission casing main body, each two transmission casing ribs forms an airflow channel therebetween, and the airflow channel extends substantially along a direction parallel to an axis of the electric motor.

6. The hedge trimmer as claimed in claim 5, wherein the electric motor casing is disposed with a fan therein, the electric motor casing is formed with air outlets, and airflow produced by the fan enters into the electric motor casing from the airflow channel and is then exhausted out from the air outlets.

7. The hedge trimmer as claimed in claim 6, further comprising a circuit board disposed in the tool housing assembly and wherein the tool housing assembly is formed with an air inlet whereby airflow produced by the fan sequentially flows through the air inlet, the circuit board, the electric motor and the air outlets.

8. The hedge trimmer as claimed in claim 1, wherein the tool housing assembly comprises a first housing and a second housing, the first housing is formed or connected with the first handle, the second housing is formed or connected with the second handle, and the battery pack is combined to the second housing.

9. The hedge trimmer as claimed in claim 8, wherein the first housing and the second housing respectively comprise a first rotation connection part and a second rotation connection part for making them be rotatably connected about a rotation axis such that the second housing has a first rotation position and a second rotation position relative to the first housing and a plane perpendicular to the rotation axis and a plane perpendicular to a longitudinal axis of the trimming blade are obliquely intersected.

10. The hedge trimmer as claimed in claim 9, wherein in the plane perpendicular to the longitudinal axis of the trimming blade the first rotation connection part and the electric motor are located at a same side of the trimming blade.

11. A hedge trimmer comprising:
an electric motor, the electric motor comprising a stator assembly and a rotor assembly;
a transmission mechanism coupled to the electric motor and for being driven by the electric motor;
a trimming blade coupled to the transmission mechanism and for being driven by the transmission mechanism to perform a shearing motion;
an electric motor casing for accommodating the rotor assembly of the electric motor;
a tool housing assembly for accommodating the transmission mechanism and the electric motor casing at least partially therein;
a first handle connected to the tool housing assembly and located between the trimming blade and the electric motor; and
a second handle connected to the tool housing assembly;
wherein the electric motor is located between the first handle and the second handle, the tool housing assembly includes a first material part which at least is made of a first material, the electric motor casing includes a second material part which at least is made of a second material, the second material part is at least partly exposed outside the tool housing assembly, and a thermal conductivity of the second material is higher than a thermal conductivity of the first material, and
wherein the electric motor is at least partially located above of a chamber surrounded by the tool housing assembly, and at least a portion of the electric motor casing surrounds the electric motor located outside of the tool housing assembly.

12. The hedge trimmer as claimed in claim 11, wherein the first material comprises a plastic and the second material comprises a metal.

13. The hedge trimmer as claimed in claim 11, wherein the hedge trimmer further comprises a transmission casing for accommodating the transmission mechanism and the transmission casing is exposed outside the tool housing assembly.

14. The hedge trimmer as claimed in claim 13, wherein the transmission casing is at least partly made of a metal material.

15. The hedge trimmer as claimed in claim 14, wherein the second material part is exposed outside the tool housing assembly from one side and the transmission casing is exposed outside the tool housing assembly from an opposite side.

16. The hedge trimmer as claimed in claim 14, wherein the transmission casing comprises a transmission casing main body formed with the chamber and a plurality of transmission casing ribs outwardly protruding from the transmission casing main body, each two transmission casing ribs forms an airflow channel therebetween, and the airflow channel extends substantially along a direction parallel to an axis of the electric motor.

17. The hedge trimmer as claimed in claim 16, wherein the electric motor casing is disposed with a fan therein, the electric motor casing is formed with air outlets, and airflow produced by the fan enters into the electric motor casing from the airflow channel and is then exhausted out from the air outlets.

18. The hedge trimmer as claimed in claim 16, further comprising a circuit board disposed in the tool housing assembly and wherein the tool housing assembly is formed with an air inlet whereby airflow produced by the fan sequentially flows through the air inlet, the circuit board, the electric motor and the air outlets.

19. The hedge trimmer as claimed in claim 11, wherein the hedge trimmer further comprises a battery pack for supplying power to the electric motor, the tool housing assembly includes a first housing and a second housing, the first housing is formed or connected with the first handle, the second housing is formed or connected with a second handle, and the battery pack is combined to the second housing.

20. The hedge trimmer as claimed in claim 19, wherein the first housing and the second housing respectively comprises a first rotation connection part and a second rotation connection part for making them be rotatably connected about a rotation axis such that the second housing has a first rotation position and a second rotation position relative to the first housing, a plane perpendicular to the rotation axis and a plane perpendicular to a longitudinal axis of the trimming blade are obliquely intersected, and, in the plane perpendicular to the longitudinal axis of the trimming blade, the first rotation connection part and the electric motor is located at a same side of the trimming blade.

* * * * *